(12) United States Patent
Han

(10) Patent No.: US 7,143,928 B2
(45) Date of Patent: Dec. 5, 2006

(54) FLUX AND METHOD FOR JOINING DISSIMILIAR METALS

(75) Inventor: Geum Tai Han, Daejeon (KR)

(73) Assignee: Samyoung Machinery Co., Ltd., Daejeon (KR), part interest ( * ) Notice: Subject to any disclaimer, the term of this patent is extended or adjusted under 35 U.S.C. 154(b) by 10 days.

(21) Appl. No.: 11/227,683

(22) Filed: Sep. 15, 2005

(65) Prior Publication Data

US 2006/0091187 A1 May 4, 2006

(30) Foreign Application Priority Data

Oct. 28, 2004 (KR) .................... 10-2004-0086744

(51) Int. Cl.
*B23K 31/02* (2006.01)
*B23K 1/20* (2006.01)
*B23K 5/22* (2006.01)
*B23K 35/34* (2006.01)

(52) U.S. Cl. ........................ 228/207; 148/23

(58) Field of Classification Search .................... None
See application file for complete search history.

(56) References Cited

U.S. PATENT DOCUMENTS

| | | | |
|---|---|---|---|
| 1,533,539 A * | 4/1925 | Cleveland ................ | 148/23 |
| 2,322,416 A * | 6/1943 | Coleman et al. ........... | 148/26 |
| 2,323,666 A * | 7/1943 | Medsker ................... | 164/102 |
| 3,275,201 A * | 9/1966 | Tedeschi et al. ......... | 222/402.25 |
| 3,412,782 A * | 11/1968 | Fromson .................. | 164/98 |
| 3,479,231 A * | 11/1969 | Joseph ..................... | 75/252 |
| 3,649,249 A * | 3/1972 | Halley et al. ............ | 75/305 |
| 3,975,612 A | 8/1976 | Nakazaki et al. ........ | 219/121.14 |
| 3,999,031 A | 12/1976 | Yonezawa et al. ....... | 219/121.14 |
| 4,189,318 A * | 2/1980 | Zorev et al. ............. | 75/305 |
| 5,322,205 A | 6/1994 | Kato et al. ............... | 228/110.1 |
| 5,526,977 A * | 6/1996 | Wei ......................... | 228/208 |
| 6,149,049 A | 11/2000 | Loftfield et al. ........ | 228/164 |
| 6,452,139 B1 | 9/2002 | Benoit et al. ............ | 219/617 |
| 6,708,872 B1 * | 3/2004 | Gruber et al. ........... | 228/248.1 |
| 6,752,198 B1 * | 6/2004 | Heijkoop et al. ........ | 164/112 |

FOREIGN PATENT DOCUMENTS

| | | |
|---|---|---|
| KR | 1990-007403 | 10/1990 |
| KR | 1993-0007666 | 8/1993 |
| KR | 1996-0015802 | 11/1996 |
| KR | 10-0136954 | 2/1998 |
| KR | 10-0143744 | 4/1998 |
| KR | 10-0205160 | 7/1999 |
| KR | 2000-0046439 | 7/2000 |
| KR | 2001-0061826 | 7/2001 |
| KR | 2002-0026768 | 4/2002 |
| KR | 10-0479486 | 3/2005 |
| KR | 10-2005-0078323 | 8/2005 |

* cited by examiner

*Primary Examiner*—Lynne R. Edmondson
(74) *Attorney, Agent, or Firm*—Ladas & Parry LLP

(57) ABSTRACT

Disclosed herein is a method for joining dissimilar metals without a need for a separate welding process. The method comprises applying a flux on a metal to be joined, inserting the metal into a mold, and injecting a molten metal into the mold. Thus, the base metal to be cast and the different metal are joined simultaneously with a casting process.

5 Claims, No Drawings

FLUX AND METHOD FOR JOINING DISSIMILIAR METALS

BACKGROUND OF THE INVENTION

1. Field of the Invention

The present invention relates to a flux and method for joining dissimilar metals, and more particularly, to a method for joining dissimilar metals using a borax-based flux.

2. Background of the Related Art

Generally, a cylinder block, which is used in a hydraulic motor and pump, rotates on a valve plate, a counter-friction material, at high speed and high pressure, to form hydraulic pressure, thus obtaining kinetic energy or converting kinetic energy to hydraulic energy. In this regard, friction occurs between the cylinder block rotating at high speed and high pressure and the valve plate and causes energy loss and the mechanical abrasion of each element. For this reason, it is needed to minimize the friction.

It is occasionally needed to join dissimilar metals according to the requirements for engine bushings or pipes requiring oxidation resistance. Accordingly, various methods for joining the dissimilar metals are being developed.

Regarding these methods, Korean patent publication No. 10-1993-7666 discloses a liquid phase diffusion joining method including the use of insert materials having a higher melting temperature than that of a base metal. The method disclosed in this publication uses the diffusion reaction between the insert materials and the base material, in which the insert materials have a purity of 95% and are selected from the group consisting of B, C, Hf and Si, and the base material is selected from the group consisting of Ni, Co, Fe and Ti.

Korean patent registration No. 10-0205160 discloses a joining part between Ni—Ti alloy and a dissimilar metal, and a method for forming the same. The method disclosed in this patent comprises bring the joining surfaces of the Ni—Ti alloy component and the dissimilar metal component into contact, heating the contacted metal components to the fusion temperature of either of the two metal components so as to fuse the two components by local reaction, softening the metal components at high temperature, and applying high pressure to both the metal components to form a fusion-joined texture at the joining interface.

Korean patent publication Nos. 10-1996-15802 and 10-0143744 disclose methods for joining dissimilar metals to a hollow cylinder. One method disclosed in these patents comprises placing a joining metal in the hallow of a base metal, filling the hollow of the joining metal with a thermal insulation material for making directional solidification, heating the resulting structure in a general atmosphere or a vacuum furnace to a temperature lower than the melting point of the base metal but higher than the melting temperature of the joining metal, and cooling the heated metals. Another method disclosed in the patents includes the use of any one of Zn and P as an additive.

Korean patent registration No. 10-0136954 discloses a joining method between dissimilar metals, such as aluminum-stainless steel, or between dissimilar materials, such as metal-ceramic. The method disclosed in this publication comprises vacuum-depositing an active metal evaporation material on the joining surface of a base material, penetrating and diffusing the active metal deposition layer into the base material, inserting a filler metal between the two materials, and thermally treating the resulting structure at 900–950° C. for 10–50 minutes under a vacuum atmosphere.

Korean patent laid-open publication No. 10-2000-46439 discloses a method for joining dissimilar materials, which comprises kneading hard powder and brazing filler metal into one flexible mat, and joining the flexible mat to a base metal using a polymer binder. Korean patent laid-open publication No. 10-2001-61826 discloses a method comprising forming copper alloy powder into a liner material having a given shape, laying the liner material on a base material, and pressing and sintering the resulting structure at a temperature of 650–900° C. under a pressure of 0.1–40 $kgf/cm^2$.

Korean patent laid-open publication No. 10-2002-26768 discloses a method for joining dissimilar metal plates, which comprises laying a non-ferrous alloy plate on a ferrous alloy element, applying a given pressure to the two materials at a lower temperature than their melting point so as to enhance the adhesion therebetween, and thermally treating the resulting structure at a higher temperature than the recrystallization temperature thereof under a reducing or non-oxidizing atmosphere. Korean patent registration No. 10-0479486 discloses a method comprising joining a liner to a base material in a heating furnace at high temperature. Korean Patent registration No. 10-039300 discloses a method for joining dissimilar metals, which comprises applying copper alloy powder on a base metal, pressing the two metals, sintering the resulting structure at a temperature of 880–980° C., followed by slow cooling.

However, the prior methods as described above have many problems in actual use, in that a separate thermal treatment process is performed or a separate element is made.

In an attempt to solve such problems, Korean patent application No. 10-2004-5718 filed in the name of the applicant discloses a method for joining dissimilar metals, which comprises mixing a flux with metal powder, coating the mixture on a metal to be joined, and preheating the coated metal. However, this method is complicated in that the mixture of the flux and the metal powder is made and the preheating process is performed.

SUMMARY OF THE INVENTION

Accordingly, the present invention has been made to solve the above-mentioned problems occurring in the prior art, and it is an object of the present invention to provide a flux for use in casting a base metal to be joined with a different metal, and at the same time, joining the different metal to the base metal, unlike the prior thermal treatment methods.

It is another object of the present invention to provide a method for joining dissimilar metals using the flux.

To achieve the above objects, in one aspect, the present invention provides a borax-based paste flux comprising 8–13% by weight of boric acid, 21–25% by weight of borax, 34–45.5% by weight of calcium fluoride, 26–32% by weight of hydrofluoric acid, and 0.5–1.5% by weight of other substances.

DETAILED DESCRIPTION OF THE PREFERRED EMBODIMENTS

In the borax-based paste flux according to the present invention, the borax functions to clean the surface of a weld material by removing rust (metal oxide). If it is excessively used, boron carbide ($B_4C$) will be excessively formed on the molten surface of a weld metal, leading to the risk of the excessive abrasion and cracking of cutting tools in mechanical processing. For this reason, the borax is used in an amount within the above-specified range.

Also, the boric acid acts as a diffusion accelerator, is soluble in water and makes the paste dilute, thus making its application easy. Its excessive use also will result in the deposition of a large amount of boron carbide ($B_4C$). For this reason, it is used in an amount within the above-specified range.

Also, the calcium fluoride acts as a melting accelerator which allows a solid surface to be melted even at low temperature. To adjust the use temperature of the flux to 700–800° C., the calcium fluoride is used in an amount of 34–45.5% by weight.

Also, the hydrofluoric acid functions to remove silicon (Si) and carbon (C) ash from the weld portion of cast iron and to allow a molten bath to spread on the surface of the base metal to be joined. To make these functions sufficient, it is preferably used in an amount of 26–32% by weight. Its excessive use is not preferable because its toxicity during use is strong.

The other substances are inevitable impurities, such as calcium oxide and sodium oxide, which are naturally contained during preparation processes.

In another aspect, the present invention provides a method for joining dissimilar metals, which comprises the steps of: (S1) diluting the flux with water and applying the flux dilution on the surface of a metal to be joined, followed by drying; (S2) inserting the metal from the step (S1) into a mold; and (S3) injecting a molten metal into the mold.

In the step (S1), the borax-based paste flux is preferably used after suitably diluted with water, and the step (S1) and the step (S2) may also be carried out in the reverse order. In order words, it is also possible that the metal to be joined is inserted into the mold, after which the flux is applied on the joining surface of the metal, and the molten metal is injected into the mold.

Also, in the step (S1), the flux is applied to a thickness of about 30–100 μm. This is because the excessive application of the flux can result in the generation of pinholes around the joining surface due to the brittleness of the joining surface and the generation of gas.

In the present invention as described above, since the joining of the dissimilar metals is made by the diffusion of the molten metal through the applied flux, the dissimilar metals need not to be intermetallic compounds. Thus, the molten metal to be joined may also be not only cast iron but also cast steel, the different metal may be selected from the group consisting of cast iron, cast steel, copper alloys and stainless-based metals.

Hereinafter, the present invention will be described in more detail by a preferred example.

The joining between spheroidal graphite cast iron and an iron plate will be described by way of one example.

The inventive borax-based paste flux as described above was prepared. On an iron plate placed in a mold, the flux was applied to a thickness of 60 μm. Then, molten spheroidal graphite cast iron was poured and cast in the mold.

The cast part and the iron plate were perfectly welded to each other and subjected to microscopic observation. The observation results showed that, in about 0.28 mm of a portion in the casting direction in the cast part, the ferrite texture was modified into the perlite texture (HV220), and about 0.5 mm of a portion of the iron plate was modified into the perlite texture. Also, carbide was deposited at a portion of the boundary between the ferrite and perlite structures of the cast portion.

As can be seen from the foregoing, according to the present invention, the dissimilar metals can be easily joined by the diffusion of the molten metal through the flux without needs for a separate thermal treatment or subsequent process, unlike the prior art. Particularly, the production of a cast-iron ware having the desired shape and the joining of the dissimilar metals can be simultaneously achieved by previously making a mold having the desired shape, applying the flux on the metal to be joined, inserting the metal into the mold and performing the casting process with the mold. Also, the heat of the molten bath in the mold is used so that the joining of the dissimilar metals can be achieved in an economical and easy manner.

What is claimed is:

1. A paste-type borax-based flux for joining dissimilar metals, comprising 8–13% by weight of boric acid, 21–26% by weight of borax, 34–45.5% by weight of calcium fluoride, 26–32% by weight of hydrofluoric acid and 0.5–1.5% by weight of inevitable impurities.

2. The paste-type borax-based flux of claim 1, which is applied in a paste form diluted with water.

3. The paste-type borax-based flux of claim 1, wherein the inevitable impurities are calcium oxide (CaO) and/or sodium oxide ($Na_2O$).

4. A method for joining dissimilar metals, which comprises inserting a metal to be joined, into a mold, applying a flux on the joining surface of the metal, and injecting a molten metal into the mold, wherein the flux comprises 8–13% by weight of boric acid, 21–26% by weight of borax, 34–45.5% by weight of calcium fluoride, 26–32% by weight of hydrofluoric acid and 0.5–1.5% by weight of inevitable impurities.

5. The method of claim 4, wherein the flux is applied to a thickness of 30–100 μm.

\* \* \* \* \*